(12) United States Patent
Hori et al.

(10) Patent No.: US 8,218,206 B2
(45) Date of Patent: Jul. 10, 2012

(54) COLOR CONVERSION USING TRANSFORMED GAMUTS

(75) Inventors: Ayumi Hori, Kawasaki (JP); Manabu Yamazoe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 616 days.

(21) Appl. No.: 11/459,492

(22) Filed: Jul. 24, 2006

(65) Prior Publication Data

US 2007/0030498 A1 Feb. 8, 2007

(30) Foreign Application Priority Data

Aug. 2, 2005 (JP) ................................ 2005-224593

(51) Int. Cl.
*G03F 3/08* (2006.01)
*H04N 1/60* (2006.01)
(52) U.S. Cl. ..................... 358/518; 358/1.9; 358/520
(58) Field of Classification Search ............... 358/1.9, 358/518, 520
See application file for complete search history.

(56) References Cited

U.S. PATENT DOCUMENTS

| | | | | |
|---|---|---|---|---|
| 5,909,291 | A * | 6/1999 | Myers et al. .................. 358/523 |
| 6,373,595 | B1 * | 4/2002 | Semba et al. .................. 358/1.9 |
| 6,437,792 | B1 | 8/2002 | Ito et al. | |
| 6,954,288 | B2 | 10/2005 | Uekasa et al. ................. 358/1.9 |
| 7,034,844 | B2 | 4/2006 | Akiyama et al. .............. 345/590 |
| 7,079,152 | B2 | 7/2006 | Akiyama et al. .............. 345/589 |
| 7,116,441 | B1 * | 10/2006 | Matsuoka ....................... 358/1.9 |
| 7,158,671 | B2 | 1/2007 | Yamazoe et al. ............... 382/167 |
| 7,177,465 | B1 * | 2/2007 | Takahira ........................ 382/166 |
| 2003/0052894 | A1 | 3/2003 | Akiyama et al. .............. 345/589 |
| 2005/0280848 | A1 * | 12/2005 | Seko .............................. 358/1.9 |
| 2006/0187231 | A1 | 8/2006 | Akiyama et al. .............. 345/589 |
| 2006/0232803 | A1 | 10/2006 | Hori et al. ...................... 358/1.9 |
| 2006/0274340 | A1 | 12/2006 | Yamazoe ........................ 358/1.9 |
| 2007/0030498 | A1 | 2/2007 | Hori et al. ...................... 358/1.9 |
| 2007/0030499 | A1 | 2/2007 | Hori .............................. 358/1.9 |

FOREIGN PATENT DOCUMENTS

| | | |
|---|---|---|
| JP | 4-040072 | 2/1992 |
| JP | 6-225130 | 8/1994 |
| JP | 2000-165692 | 6/2000 |
| JP | 2000-278546 | 10/2000 |

OTHER PUBLICATIONS

Office Action in JP 2005-224593 dated Jan. 22, 2010.
Office Action dated Jun. 4, 2010 in JP 2005-224593.

* cited by examiner

*Primary Examiner* — Benny Q Tieu
*Assistant Examiner* — Sunil Chacko
(74) *Attorney, Agent, or Firm* — Fitzpatrick, Cella, Harper & Scinto

(57) ABSTRACT

The gamut of a printer has poor saturation reproducibility in a low-lightness region, often has a shape from which the gamut is cut away, and sometimes locally forms a part having extremely low color reproducibility. Hence, upon converting colors on a first gamut onto those on a second gamut, a third gamut is generated by transforming the second gamut for the purpose of the conversion, and the colors on the first gamut are mapped onto the third gamut. The colors on the first gamut are converted into those on the second gamut based on the mapping result.

8 Claims, 14 Drawing Sheets

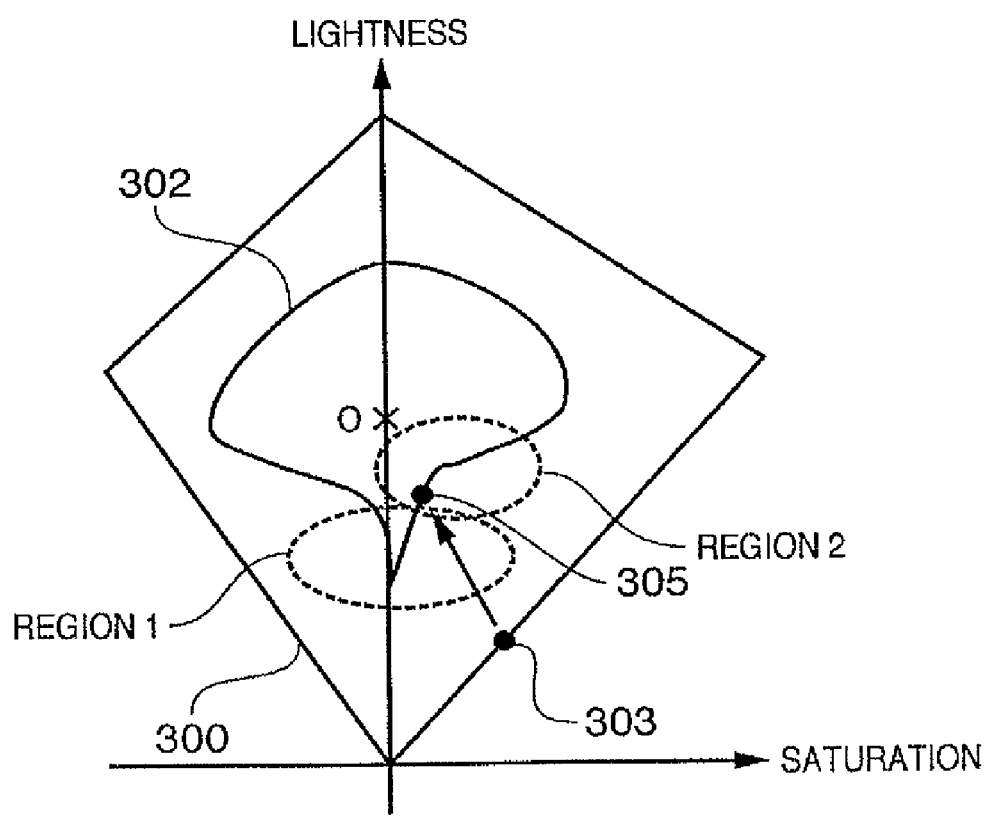

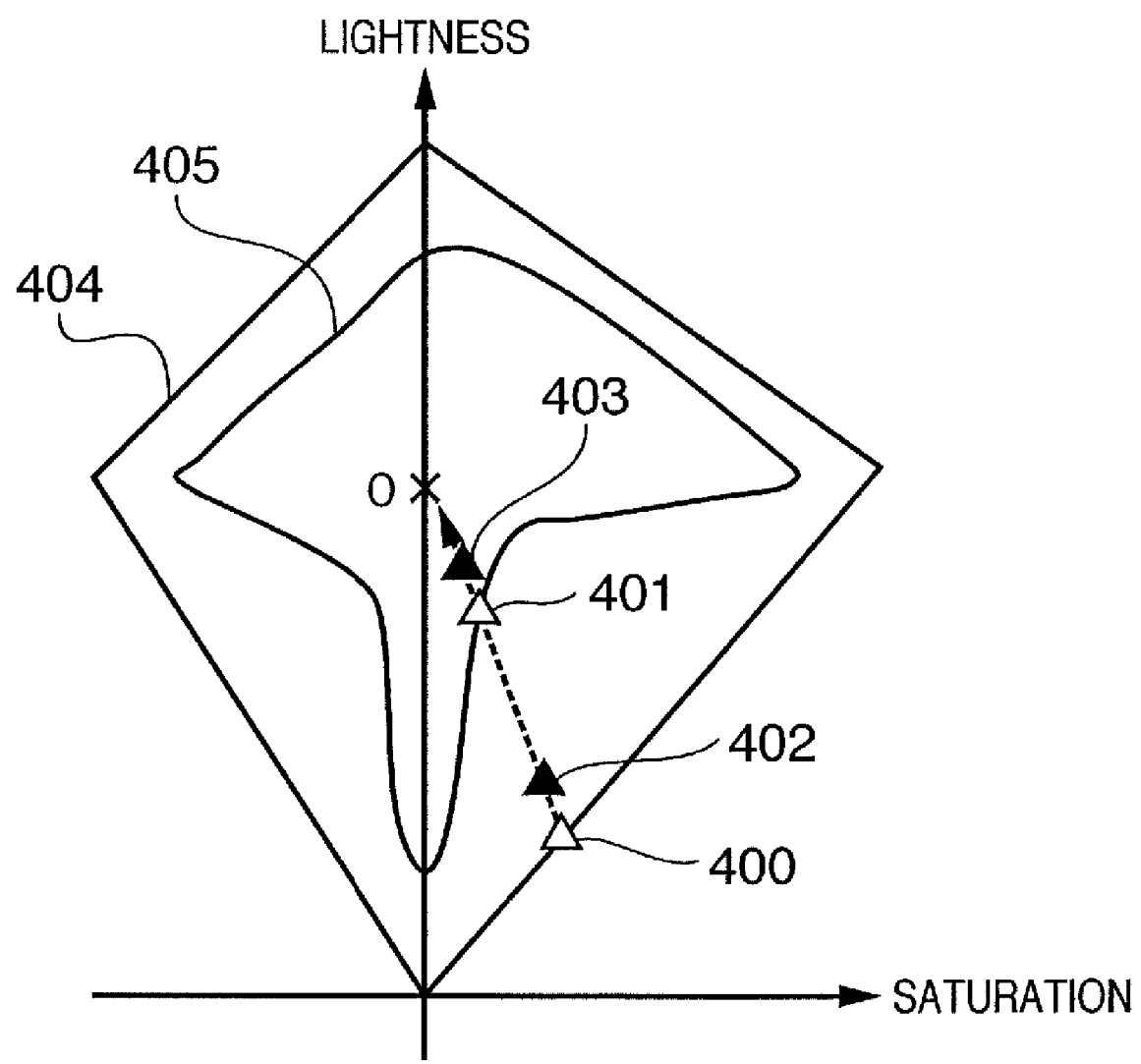

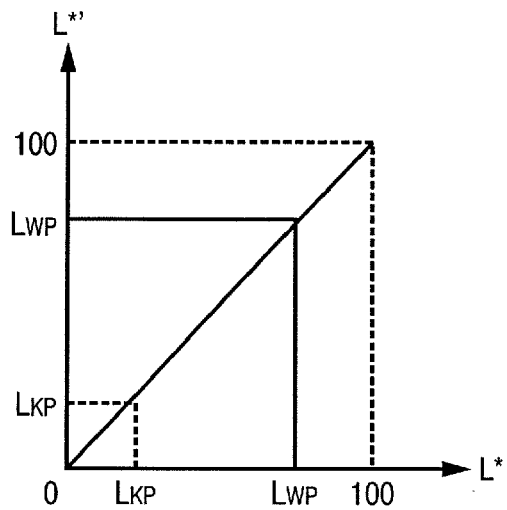
F I G. 10A
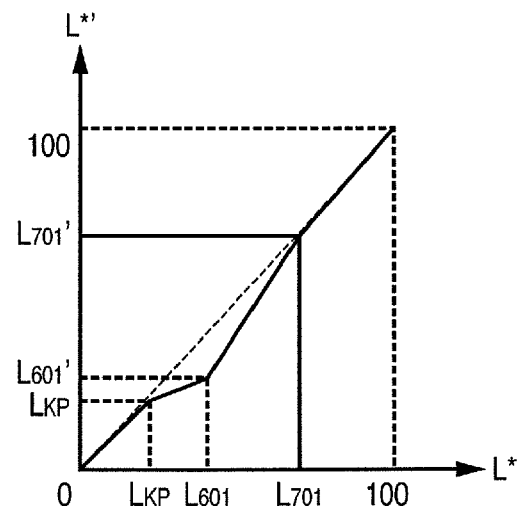
F I G. 10B
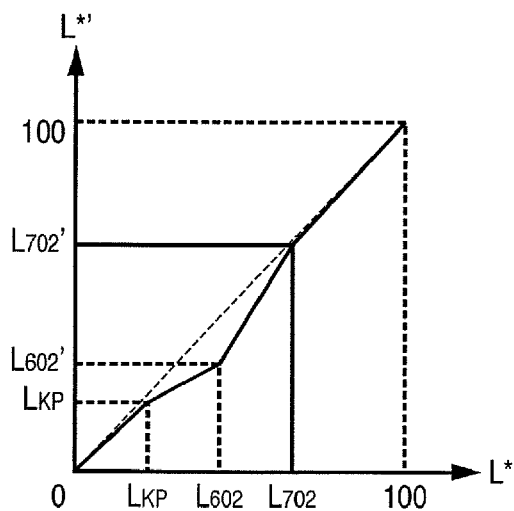
F I G. 10C
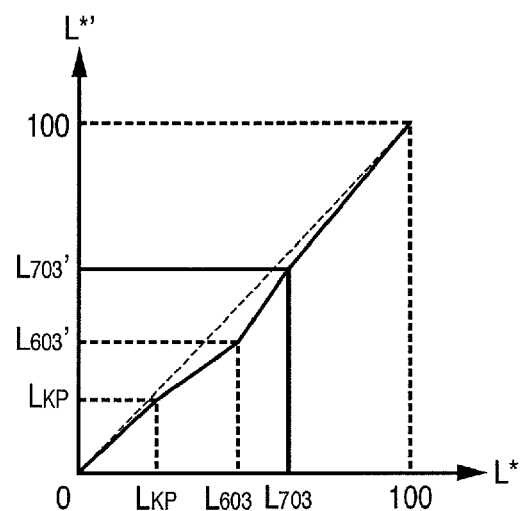
F I G. 10D

COLOR CONVERSION USING TRANSFORMED GAMUTS

BACKGROUND OF THE INVENTION

1. Field of the Invention

The present invention relates to color processing for converting a first gamut into a second gamut.

2. Description of the Related Art

In recent years, digital imaging apparatus such as digital cameras, image scanners, and the like have prevailed, and digital images can be readily acquired. On the other hand, the full-color hard copy technique is evolving at a rapid pace. Especially, printing using an ink-jet system can assure print image quality equivalent to silver halide photos, and is popularly used. Networks such as the Internet and the like have prevailed, and many users are in an environment in which they can connect various devices to the network. In such environment with diversified input and output devices, there are many opportunities to input and output color image data between devices having different gamuts. For example, a hard copy of a color image on a monitor with a broad gamut is formed by a printer having a different gamut.

As a technique for attaining identical color reproduction between devices having different gamuts, a color management system (to be referred to as "CMS" hereinafter) is prevalent. FIG. 1 is a view showing an overview of the arrangement of this CMS, and shows the CMS which uses a device-independent color space.

FIG. 1 shows an example in which input devices (a camera, scanner, and the like) and output devices (a printer, monitor, and the like) are connected. In this case, conversion from a color signal of the input system into that of the output system is implemented via profiles of the devices and a profile connection space (PCS). Note that the PCS is a device-independent color space, and for example, CIEXYZ, CIELab, and the like are available. Each profile is provided as a lookup table (LUT) as a conversion table which describes conversion formulas that connect respective device colors and the PCS or the relationship between device colors and the PCS.

FIG. 2 is a block diagram showing the basic arrangement of the CMS.

Referring to FIG. 2, an image processing apparatus 201 is a computer apparatus which executes color processing and the like associated with the CMS. An image input device 202 is a device such as a camera, scanner, or the like which inputs an image to the image processing apparatus 201. An image display device 203 is a device such as a monitor which displays an image. An image output device 204 is a device such as a printer which prints out an image supplied from the image processing apparatus 201.

In the image processing apparatus 201, an image input unit 205 inputs an image from the image input device 202. An image display unit 206 generates a signal required to display an image on the image display device 203. A color matching processor 207 performs color matching between the colors of an image which is input from the image input device 202 and is displayed on the image display device 203 with those of an image which is printed out by the image output device 204. An image processor 208 performs tone conversion processing, color conversion processing, and the like of an image to be output to the image output device 204. An image output unit 209 generates a signal required to output an image to the image output device 204.

Furthermore, the image processing apparatus 201 comprises a camera profile (or scanner profile) 210 for the image input device 202. Also, the image processing apparatus 201 comprises a monitor profile 211 for the image display device 203 and a printer profile 212 for the image output device 204. Note that the profiles 210 to 212 are stored as data files in a storage device such as a hard disk or the like.

The system shown in FIG. 2 has an advantage of easily coping with different devices by changing the profiles 210 to 212 to be used in correspondence with a change of input/output devices even when input and output devices connected are changed.

In order to allow the output device to reproduce colors that can be acquired by the input device, or in order to allow the input device to acquire colors which can be reproduced by the output device, the CMS uses a gamut technique that can absorb the influences of different gamuts between the input and output devices.

For example, Japanese Patent Application Laid-Open No. 6-225130 describes a general mapping method between input and output devices with different gamuts. That is, this reference describes a method of converting an input color space into a device-independent color space (uniform color space), and mapping colors, which cannot be reproduced by the output device of those of this color space in a minimum color difference direction, and a method of performing nonlinear mapping according to saturation in a constant lightness direction. A method described in Japanese Patent Application Laid-Open No. 4-40072 converts an input color space into a uniform color space or HVC color space as a device-independent color space, and checks if a color of this color space falls outside a gamut at the output destination. When the color falls outside the gamut, that color is mapped on a color which has the same lightness and hue values and a maximum saturation value.

However, the aforementioned mapping technique does not consider any shape of the gamut of the output device. For this reason, problems to be described below may be posed.

FIGS. 3A and 3B show an sRGB color space 300 as an input color space of an input device (e.g., a digital camera) and a gamut 301 or 302 of an output device (e.g., an ink-jet printer) using a CIELab color system.

The gamut 302 of the printer has poor saturation reproducibility in a low-lightness region compared to the gamut 301, and has a shape from which the gamut is cut away. In this way, the gamut of the printer often locally has a region with extremely poor color reproducibility, and may indicate a cut-away shape like region 1 shown in FIG. 3B or a bored shape like region 2.

An ink-jet printer performs color separation in consideration of graininess defined by printed dots, and a total ink droplet amount (to be referred to as "receptible ink amount" hereinafter) that can be received by a print medium per unit time and unit area. In order to reduce an ink supply amount to the print media, so-called undercolor removal (UCR) for substituting a gray part reproduced by respective color inks, i.e., cyan, magenta, and yellow, by black ink is made. In case of a print medium which has an extremely small receptible ink amount, the substitution amount of the black ink must be raised by increasing the UCR amount. However, when the UCR amount is increased, most of inks used in a low-lightness region are black ink, thus causing a saturation drop. Also, compared to gray reproduced by three or four colors, the printed dot density readily becomes coarse.

Furthermore, black ink uses a composition which allows ink to readily stay (dots do not spread) on the surface layer of a print medium using a pigment-based color material since it gives priority to reproduction of characters and line images on a plain paper sheet such as a copy print sheet or the like. On the other hand, color inks use a composition which allows ink to easily permeate a print medium so as to minimize a blur at the boundaries of different colors using a dye-based color material, since they give priority to color reproduction. In such system, since dots of black ink do not spread (do not grow) compared with color inks, the ink droplet amount ejected from a print head of the printer must be increased compared to color inks. For this reason, in consideration of the receptible ink amount of the print media in UCR, the substitution amount to black ink increases, thus further lowering the color reproduction performance of the low-lightness region.

For example, when a color 303 present on the boundary of the sRGB color space 300 shown in FIG. 3A is mapped toward a convergence point O of mapping so as to fall inside the gamut 301 of the printer, it is mapped as a color 304 on the boundary of the gamut 301. On the other hand, the color 303 is mapped on a color 305 in the gamut 302 of the printer shown in FIG. 3B. Compared to these colors, the color 305 is located in a considerably lower saturation region than the color 304 and is reproduced as a dull color. That is, when the same color 303 of the sRGB color space 300 is mapped, different colors are reproduced depending on the shape differences of the gamuts of the printers.

When black dye ink is used, region 1 with the cutaway shape corresponds to a mixed region of dye ink and pigment ink. Since pigment ink has poor permeability to a print medium, it is fixed near the surface of the print medium. For this reason, when a photo, e.g., hair or the like which has low saturation and a high density is printed, dark colors are color-reproduced as a region with a large pigment amount, relatively bright colors are color-reproduced as a region with a large dye amount. As a result, such photo seems as if it were suffering color unevenness.

SUMMARY OF THE INVENTION

The first aspect of the present invention discloses a color processing method of converting colors on a first gamut to colors on a second gamut, comprising the steps of: generating a third gamut by transforming the second gamut for purpose of the conversion; mapping the colors on the first gamut onto the third gamut; and converting the colors on the first gamut into the colors on the second gamut based on the mapping result.

The second aspect of the present invention discloses a color processing method of converting colors on a first gamut to colors on a second gamut, comprising the steps of: performing colorimetric matching reproduction for a partial region in the first gamut; mapping colors without colors to be reproduced as the calorimetric matching onto a third gamut to which the second gamut is transformed for the conversion; and transforming the first gamut to the second gamut based on the mapping result in the mapping step.

The third aspect of the present invention discloses a color processing method of converting colors on a first gamut to colors on a second gamut, comprising the steps of: generating a third gamut by transforming the second gamut for purpose of the conversion; transforming a partial region of the first gamut as well as the generating step; mapping the colors on the first gamut onto the third gamut; and converting the colors on the first gamut into the colors on the second gamut based on the mapping result in the mapping step.

The fourth aspect of the present invention discloses a color processing method of converting colors on a first gamut to colors on a second gamut, comprising the steps of: determining whether or not a color on the first gamut is included in a colorimetrical matching region; generating a third gamut by transforming the second gamut for purpose of the conversion based on the determination result in the determining step; mapping the colors on the first gamut onto the third gamut; and converting the colors on the first gamut into the colors on the second gamut based on the mapping result in the mapping step.

According to the present invention, upon converting a first gamut to a second gamut, conversion can be made in consideration of the shape of the second gamut. Therefore, even when the gamut of an output device has an irregular shape like a shape from which a low-lightness region is cut away or the like, preferred color reproduction can be realized by a simple method of mapping toward one convergence point.

Further features of the present invention will be become apparent from the following description of exemplary embodiments with reference to the attached drawings.

BRIEF DESCRIPTION OF THE DRAWINGS

FIGS. 3A and 3B show an sRGB color space as an input color space of an input device and the gamuts of output devices using a CIELab color system;

FIG. 4 shows given hue sections of the sRGB color space and printer gamut;

FIGS. 10A to 10D are graphs showing lightness change amounts at the saturation levels of control points according to the second embodiment;

DESCRIPTION OF THE EMBODIMENTS

Color processing according to preferred embodiments of the present invention will be described in detail hereinafter with reference to the accompanying drawings. In the following description, as an example, the type of an input color space is an sRGB color space as a general input color space of a digital camera, and an output device is an ink-jet printer. Note that the sRGB color space and printer gamut are handled as uniform color spaces (CIELab color system) as a common color system. However, the present invention is not limited to the CIELab color system but uniform color spaces such as an Luv color space and the like need only be used. An example of gamut mapping of the sRGE color space expressed by the CIELab color system onto the printer gamut will be explained hereinafter.

First Embodiment

Tone-preserved Mapping

An embodiment in which the present invention is applied to tone-preserved perceptual mapping as one of principal mapping methods will be described first.

FIG. 4 shows given hue sections of an sRGB color space 404 and printer gamut 405. For example, when respective gamuts are expressed by discrete grids, and the remaining regions are joined by linear interpolation, they can be analyzed as continuous color spaces, as shown in FIG. 4.

The low-lightness region of the printer gamut 405 has a cutaway shape (recessed shape) due to the aforementioned cause. A point O is a convergence point of mapping, and colors outside the printer gamut 405 are linearly mapped toward the point O.

Figure 1:
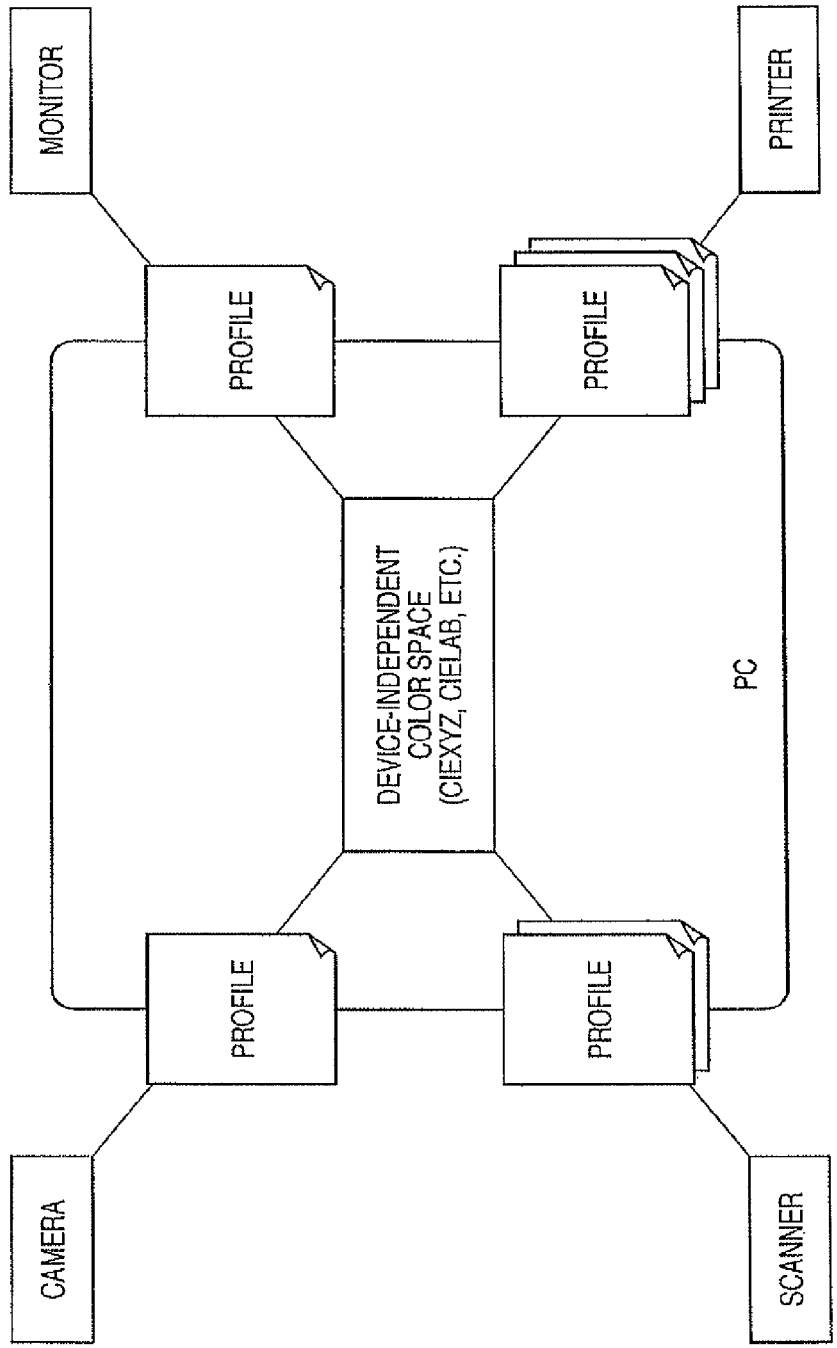
FIG. 1 is a view showing an overview of the arrangement of a CMS.
Figure 2:
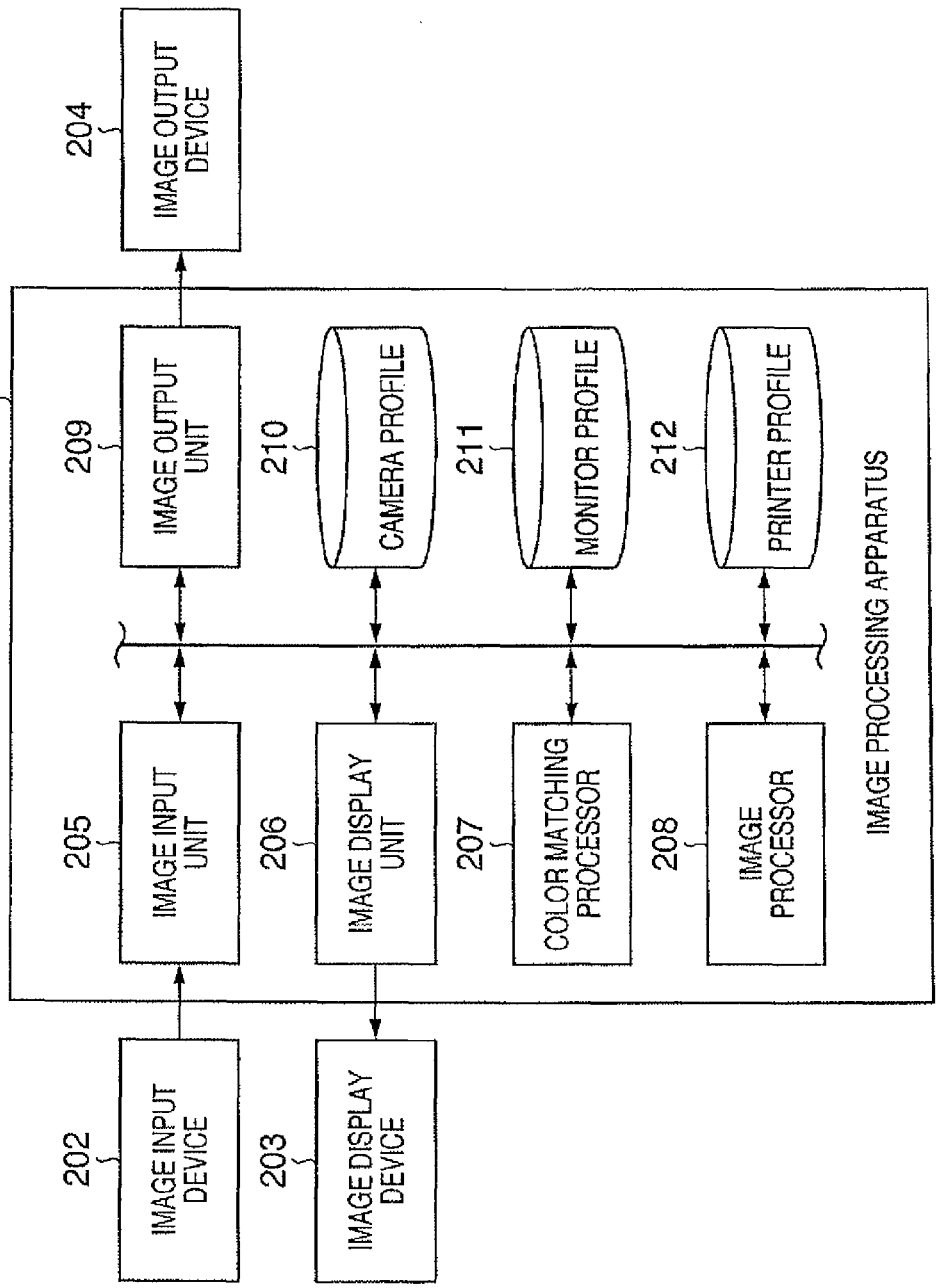
FIG. 2 is a block diagram showing the basic arrangement of the CMS.
Figure 3A:
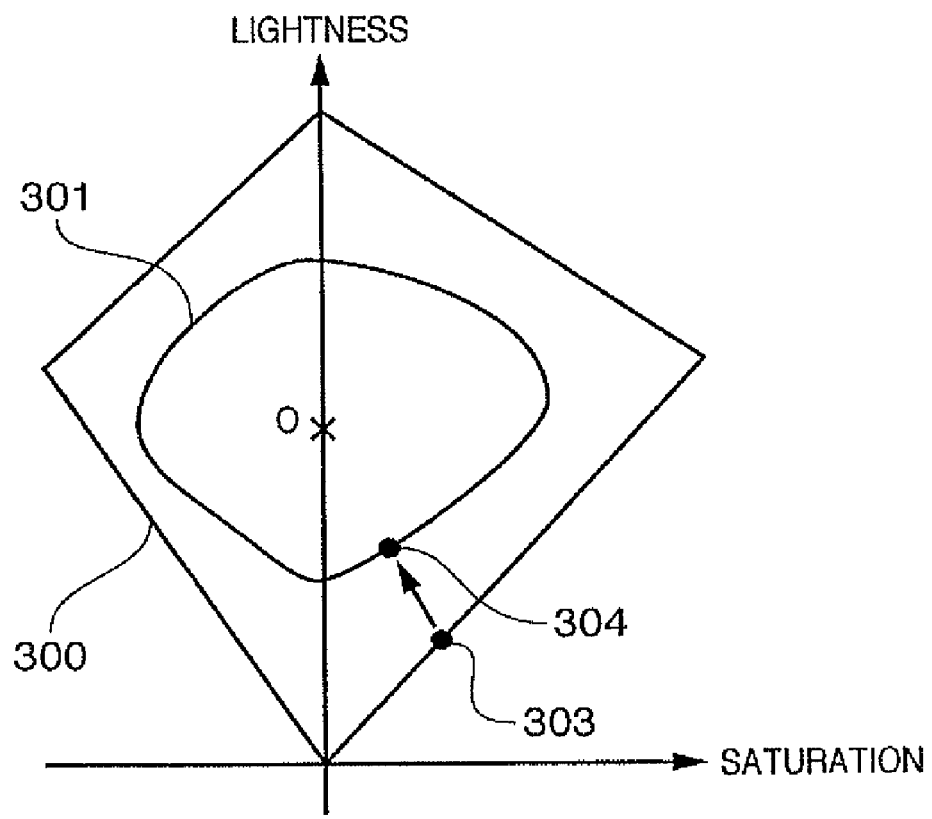
Figure 5:
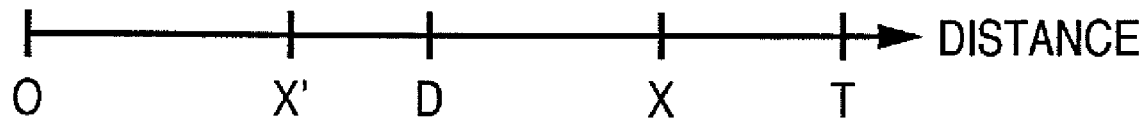
FIG. 5 is a view for explaining gamut mapping.

FIG. 5 shows the relationship of the distances from the point O to respective points so as to explain gamut mapping.

In FIG. 5, T is the distance from the convergence point O to a point 400 (see FIG. 4) on the boundary of the sRGB color space 404, and D is the distance from the convergence point O to a point 401 (see FIG. 4) on the boundary of the printer gamut 405. Also, X is the distance from the convergence point O to a mapping target color 402 (see FIG. 4) inside the sRGB color space 404. A distance X' after mapping of the color 402 is calculated by:

$$X' = D/T \cdot X \quad (1)$$

When mapping is done using such method, the color of the point 400 is mapped onto that of the point 401, and the color of the point 402 is mapped onto that of a point 403. According to this mapping method, the colors in the low-lightness region are reproduced as dull colors with low saturation due to the characteristics (the shape from which the low-lightness region is cut away) of the printer gamut 405.

In the first embodiment, these colors are mapped onto higher-saturation positions by a simple mapping method toward the convergence point O, thus realizing highly attractive color reproduction.

Virtual Transform of Printer Gamut

Figure 6:
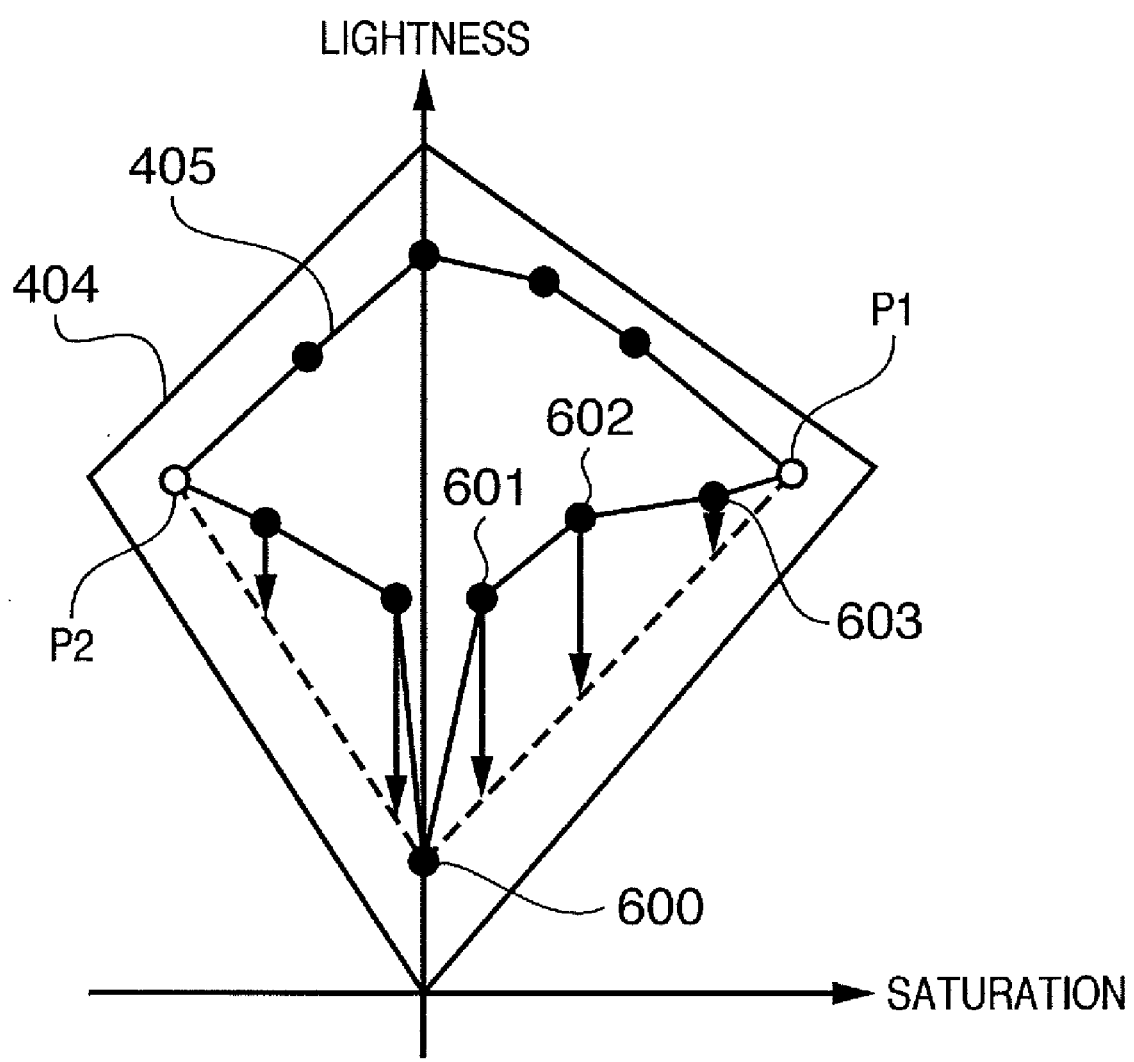
FIG. 6 is a view for explaining a virtual transform of the printer gamut.

FIG. 6 is a view for explaining a virtual transform of the printer gamut.

The printer gamut 405 of a given hue is analyzed as follows. Neighboring grids on the boundary of the printer gamut 405 are connected via lines. In this state, a given hue section is as shown in FIG. 6. Full circles (●) shown in FIG. 6 are the aforementioned grids. Especially, a grid 600 corresponds to a black point (process black) of the printer gamut 405. Also, open circles (○) shown in FIG. 6 are basic color points, and are points on the gamut corresponding to primary colors, e.g., cyan, magenta, and yellow, and their mixed colors (secondary colors), i.e., red, green, and blue (six basic colors) on the printer gamut 405. A method of virtually transforming the printer using these grids as control points will be described below.

Points P1 and P2 (○) shown in FIG. 6 indicate basic color points (e.g., red, yellow, and the like) of the printer gamut 405. FIG. 6 shows a state wherein there are two basic color points on the hue section for the sake of easy understanding. A method of obtaining L*a*b* values of the basic color points of the printer gamut is as follows.

For example, in case of an RGB printer which receives RGB signals, RGB signals (printer RGB values) and colors (e.g., L*a*b* values) specified by a colorimetry space have one-to-one correspondence for all colors in the printer gamut 405. Note that the colorimetry space corresponds to the printer gamut 405, that is obtained by measuring L*a*b* values of patches included in a color chart, which represents the gamut of a printer, using a calorimeter, and the printer forms the patches of the color chart by varying each component of an RGB signal in order. If RGB signals are specified to fall within the ranges 0≦R≦255, 0≦G≦255, and 0≦B≦255, the basic color points of the printer gamut 405 satisfy the conditions:

Red R=255, G=0, B=0

Yellow R=255, G=255, B=0

Green R=0, G=255, B=0

Cyan R=0, G=255, B=255

Blue R=0, G=0, B=255

Magenta R=255, G=0, B=255

That is, under these conditions, the corresponding L*a*b* values become the aforementioned basic color points of the printer gamut 405.

Next, onto lines which connect the black point 600 of the printer gamut 405 and the basic color points (○) P1 and P2, the grids (grids 601 to 603 and the like; to be referred to as "control points" hereinafter) on the boundary of the printer gamut 405 which are located between these points are moved in a direction to decrease the lightness level. That is, the lightness values of these control points are changed. Note that the lightness levels of the black point 600 and control points 601, 602, and 603 are respectively represented by Lbp, L601, L602, and L603.

Figure 7:
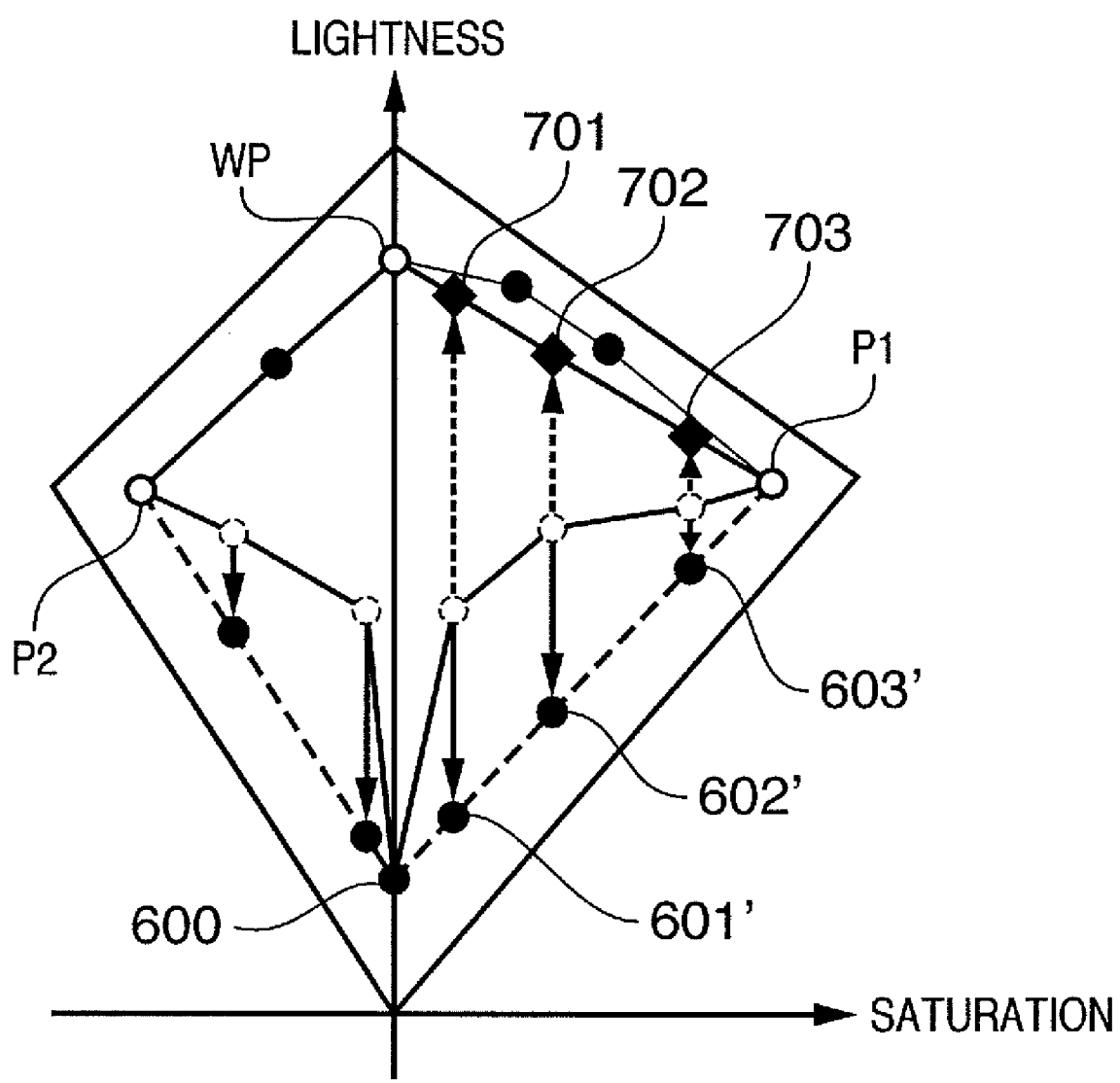
FIG. 7 is a view showing a state after control points are moved.

FIG. 7 shows a state after the control points are moved (control points 601', 602', and 603' after movement). The lightness levels of the control points after movement are respectively represented by L601', L602', and L603'. A point WP (○) shown in FIG. 7 corresponds to a white point (media white) of the printer gamut 405. Note that the lightness level of the white point is represented by Lwp.

Vectors are extended from the respective control points in a direction to increase the lightness level, and points where the vectors intersect with a line that connects the point WP and the basic color point P1 are defined as fixed lightness points. For example, the control points 601, 602, and 603 respectively correspond to fixed lightness points 701, 702, and 703. Note that the lightness levels above the fixed lightness points remain unchanged. This is because a high-lightness region of the printer gamut 405 has a smoothly bulged shape, and the gamut shape need not be transformed.

FIGS. 8A to 8D show the lightness change amount at the saturation level of each control point 601 to 603. The abscissa plots lightness L* before the transform of the gamut shape, and the ordinate plots lightness L*' after the transform of the gamut shape.

Figure 8A:
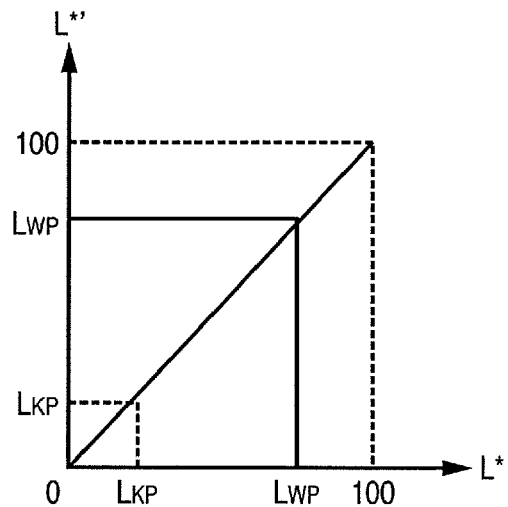
FIGS. 8A to 8D are graphs showing lightness change amounts at the saturation levels of the control points.

FIG. 8A shows a change in lightness at the saturation level of the black point 600. The black point 600 is a process black point of the printer gamut 405, and there is no change in lightness. The fixed lightness point corresponding to the black point 600 is the point WP.

Figure 8B:
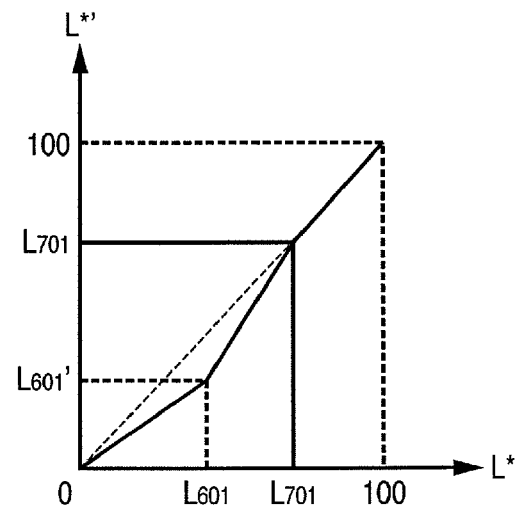
Figure 8C:
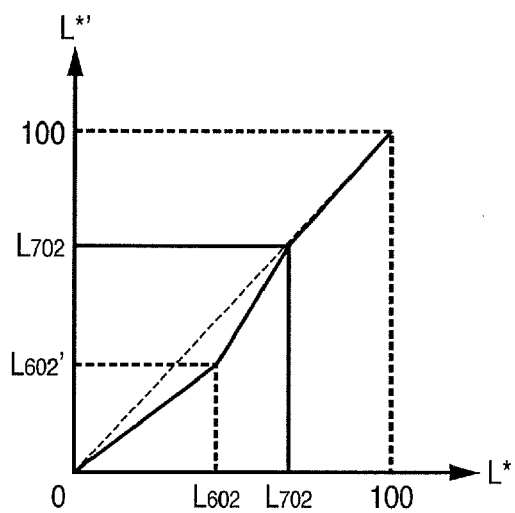
Figure 8D:
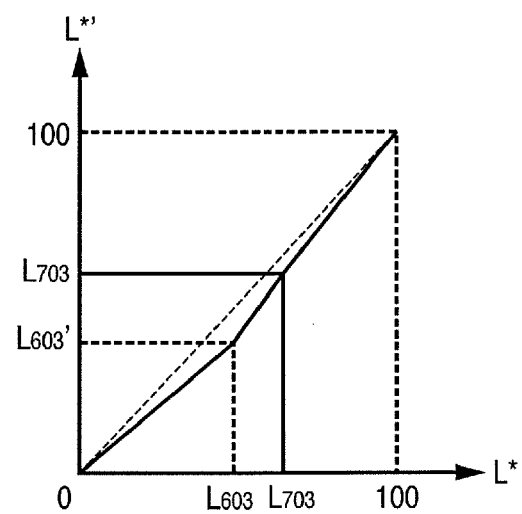

FIG. 8B shows a change in lightness at the saturation level of the control point 601, and the control point 601 (lightness L601) is decreased to the lightness L601' on the line which connects the black point 600 and basic color point PI. Since the lightness level above the fixed lightness point 701 remains unchanged, the change in lightness shown in FIG. 8B is obtained. FIGS. 8C and 8D similarly show changes in lightness at the saturation levels of the control points 602 and 603.

A lightness change amount between two points, e.g., a lightness change amount between the control points 601 and 602 or the like is calculated by linear interpolation based on the distances to these points. Next, lightness change amounts are determined by the above method for control points at the hue levels of the respective basic color points. Furthermore, between the hue levels of the respective basic color points, lightness change amounts are determined by linear interpolation between neighboring hue levels.

With the above processing, the lightness change amounts on the entire region of the printer gamut 405 can be defined. Then, to the grids of the printer gamut 405, the lightness change amounts corresponding to their positions are applied, thus bulging the cutaway shape portion of the printer gamut 405. In other words, the printer gamut 405 is virtually extended.

As described above, the colors specified by the colorimetry space and printer RGB values have one-to-one correspondence. In this case, when the printer gamut is virtually extended, the printer RGB values corresponding to the respective grids remain unchanged. That is, only the colors of the colorimetry space are changed.

Mapping

The grids on the sRGB space 404 are mapped onto the virtually extended printer gamut (to be referred to as "extended gamut" hereinafter) using the tone-preserved perceptual mapping method.

Initially, correspondence between the colors of the extended gamut and those of the printer gamut 405 is determined. The gamut is transformed by moving the grids on the boundary of the printer gamut 405 to the lines which connect the basic color points P1 and P2, and the black point 600 (by decreasing the lightness level).

Figure 9:
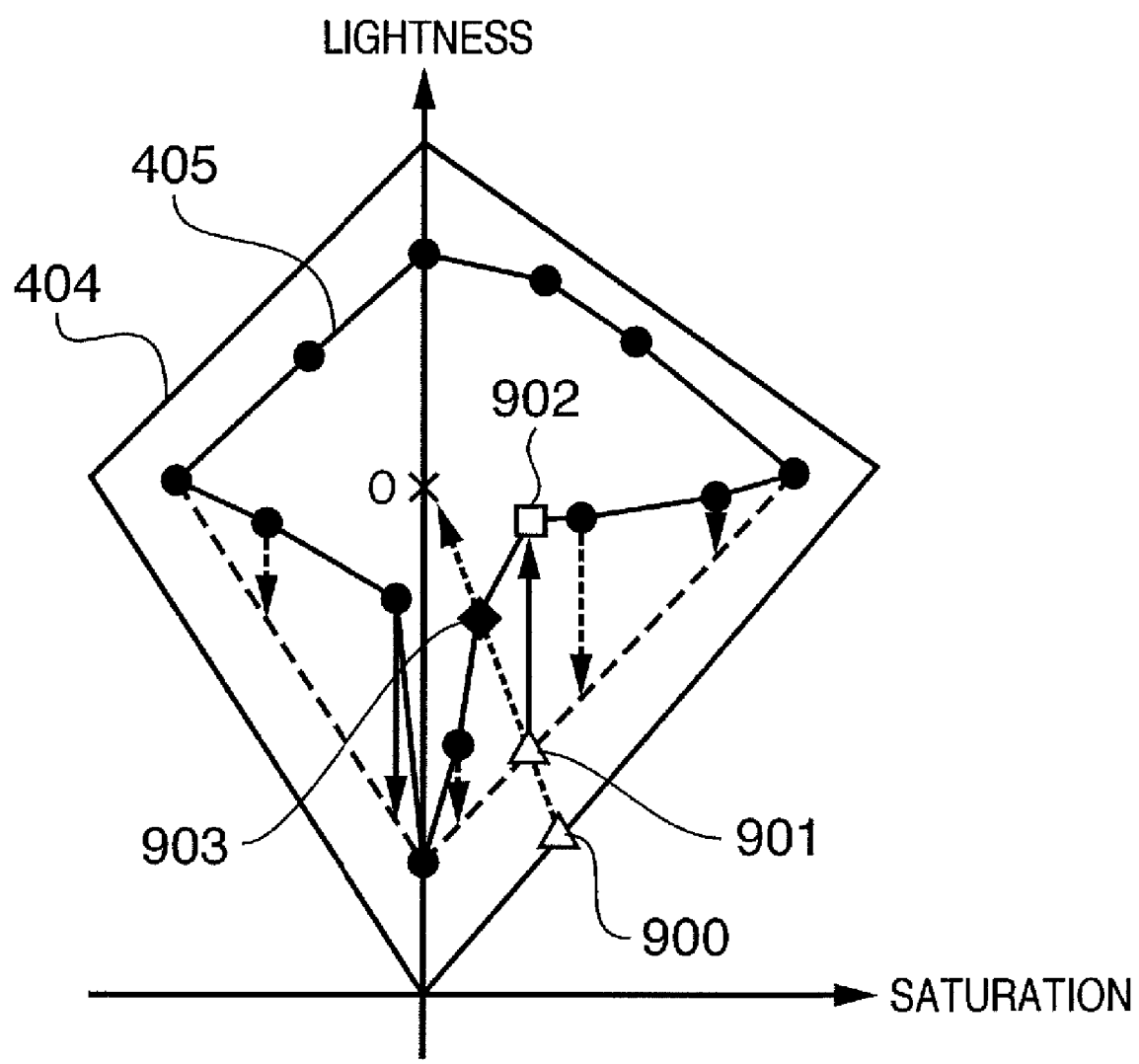
FIG. 9 is a schematic view of a state of gamut mapping according to the first embodiment.

FIG. 9 is a schematic view showing a gamut mapping state of the first embodiment. A color point 900 is a grid on the sRGB color space 404 to be mapped. When the color point 900 is mapped onto the extended gamut toward the convergence point O, it is mapped onto a color point 901. By contrast, when the color point 900 is mapped onto the printer gamut 405 toward the convergence point O, it is mapped onto a color point 903.

As described above, the grids on the original printer gamut are transformed to the virtually extended gamut. However, even after transform to the extended gamut, the printer RGB values corresponding to the grids remain unchanged. That is, the printer RGB values corresponding to the grids before extension are the same as those after extension. For this reason, the same printer RGB value as the color point 901 of the extended gamut can be detected by tracing an inverse transform to the operation for transforming the printer gamut to the extended gamut. That is, the same printer RGB value is obtained at a color point 902 of the printer gamut and the color point 901. The color point 902 has a higher lightness level than the color point 903 mapped onto the printer gamut. Therefore, since only the printer gamut is transformed to the extended gamut and mapping is made onto the extended gamut while the printer RGB values corresponding to the printer gamut remain unchanged, the grids in the low-lightness region can be mapped onto colors with higher saturation levels.

That is, the problem in which the colors in the low-lightness region are reproduced as dull colors with low saturation levels due to the characteristics (the shape from which the low-lightness region is cut away) of the printer gamut 405 can be prevented, and more preferred color reproduction can be realized.

In the example of the above description, the printer gamut 405 is transformed (extended) by utilizing the lines that connect the basic color points and the black point. However, the present invention is not limited to this. For example, the black point and the basic color points may be connected using gamma functions or curves of multi-degrees. For example, when the printer gamut 405 is extended along downwards convex curves, positions with higher lightness levels can be defined as mapping destinations. Conversely, when upwards convex curves are used, positions with lower lightness levels can be defined as mapping destinations.

Figure 13:
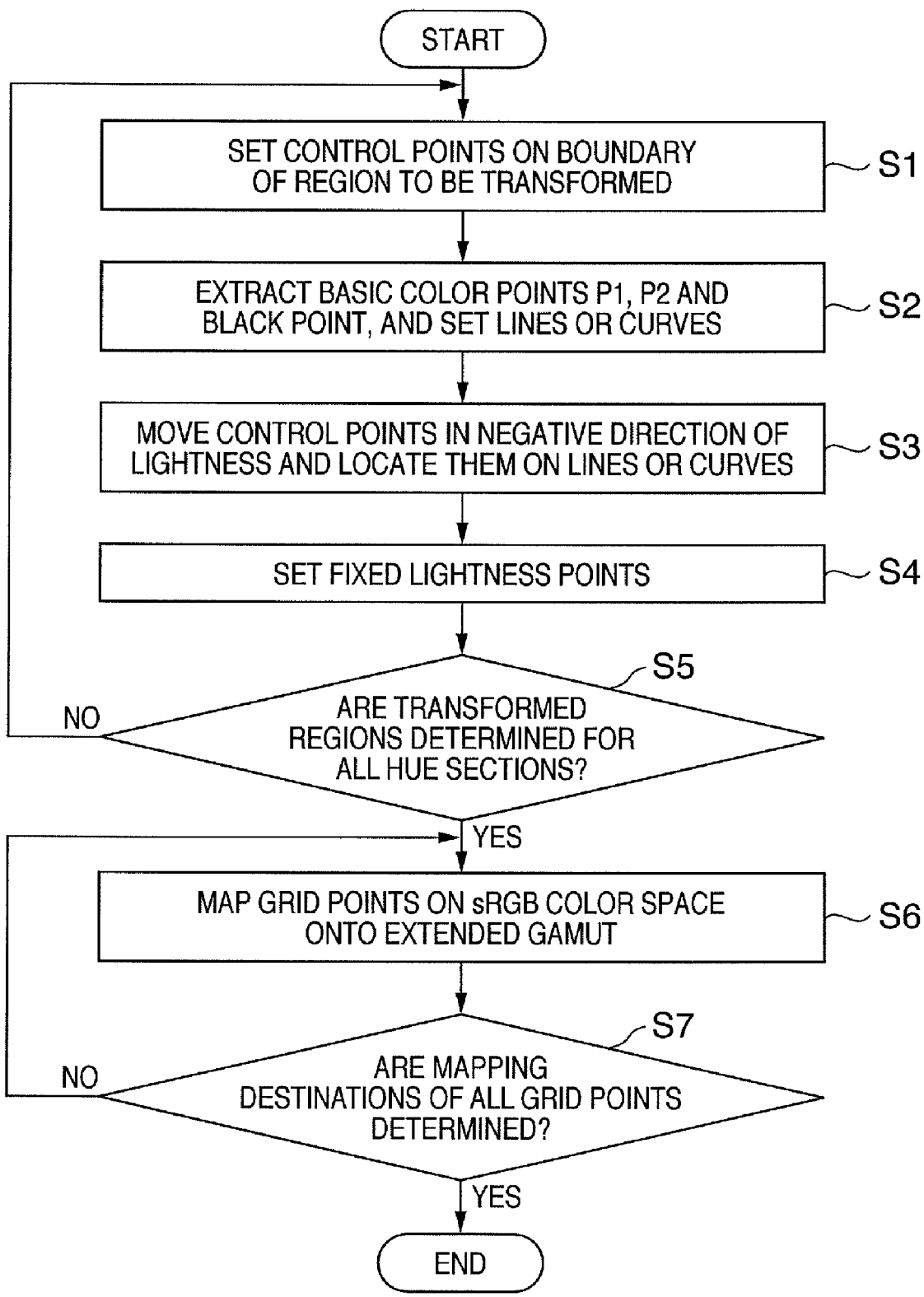
FIG. 13 is a flowchart for explaining the sequence of gamut mapping according to the first embodiment.

FIG. 13 is a flowchart for explaining the mapping sequence of the first embodiment. This processing is executed by the image processor 208.

Control points are set on the boundary of a region (to be referred to as "region to be transformed" hereinafter) having a shape from which the low-lightness region is cut away of the printer gamut 405 (S1). The basic color points P1 and P2 as shown in FIG. 6, and the black point 600 are extracted, and lines or curves used to transform (extend) the region to be transformed are set (S2). Then, the control points are moved in a direction to decrease lightness and are located on the lines or curves (S3). Vectors are extended from the control points in a direction to increase the lightness level, and points where the vectors intersect with the lines or curves that connect the point WP and the basic color points P1 and P2 are. set as fixed lightness points, thus determining the transformed region (S4). The aforementioned processing is repeated for a predetermined number of hue sections until YES is determined in step S5. In this manner, tables that describe the lightness change amounts shown in FIGS. 8A to 8D are stored in a memory of the image processor 208 for respective hue sections and control points. Therefore, based on the transformed region determined for each hue section, a three-dimensional extended gamut can be derived (generated) by interpolation. In other words, the extended gamut obtained by transforming the printer gamut 405 for mapping can be derived (generated) by the processing in steps S1 to S5. Assume that the printer RGB values corresponding to the grids on the printer gamut remain unchanged.

Next, the grids on the sRGB color space 404 are perceptually mapped on the extended gamut (S6). The mapping is repeated until it is determined in step S7 that the mapping destinations of all the grids are determined.

With the aforementioned processing, gamut mapping of the sRGB color space 404, which realizes preferred color reproduction by mapping toward one convergence point O even when the printer gamut 405 has an irregular shape, can be done. Note that the gamut mapping result, which represents one-to-one correspondence between sRGB and printer RGB, is stored in a printer profile of the printer corresponding to the printer gamut 405 as a lookup table.

In the example of the above description, the lines or curves used to transform (extend) the printer gamut 405 run between the basic color points P1 and P2, and the black point 600. However, the present invention is not limited to this. For example, the printer gamut 405 shown in FIG. 6 has a shape from which a region from the control point 602 to the black point 600 is cut away, but it has a shape in which relatively high saturation can be assured in a higher lightness region than the control point 602. For this reason, when the printer gamut 405 is transformed using the lines or curves that connect the basic color points and the black point, colors are mapped on high-saturation colors with higher lightness levels in a region where high saturation levels are originally assured. To avoid this, the grid like the control point 602 and the black point 600 are connected in place of the basic color points P1 and P2 to transform the printer gamut 405 by only the cutaway shape portion.

Furthermore, the transform of the gamut is effective not only for the region of the shape from which the low-lightness region is cut away, as shown in FIG. 6, but also it can be applied to a region which projects in a convex shape.

In this way, the grids on the gamut to be mapped are mapped onto the gamut obtained by virtually transforming the printer gamut to a shape suited to mapping. Therefore, though the easy gamut mapping for mapping toward one convergent point is used, color in the sRGB color space, which is the standard color space of the digital camera and monitor, can be mapped to the higher saturation region of the printer gamut. In this way, mapping that can obtain satisfactory color reproduction can be adaptively made without any operations for changing the convergence point according to the gamut shape.

Second Embodiment

Color processing according to the second embodiment of the present invention will be described below. Note that the same reference numerals in the second embodiment denote the same components as those in the first embodiment, and a detailed description thereof will be omitted.

As the second embodiment, an example in which the present invention is applied to calorimetric mapping which is another principal method of mapping methods and attains colorimetrical matching will be described.

The calorimetric mapping method is a method which faithfully performs color reproduction of colors included in a printer gamut and maps colors outside the printer gamut onto the printer gamut.

In the first embodiment, only the printer gamut is transformed to deviate the original correspondence between the printer gamut and sRGB color space. However, when only one of the sRGB color space and printer gamut is transformed, colors are misaligned and colorimetrical matching cannot be realized since the relative positional relationship deviates. In order to realize colorimetrical matching, the same transform as that to be applied to the printer gamut is applied to colors located inside the printer gamut of those on the sRGB color space. This is because colors are misaligned since the relative positional relationship cannot be preserved if only one gamut is transformed.

In the second embodiment, the method of setting control points, movement of the control points, interpolation, and the like are the same as those in the first embodiment.

Since the sRGB color space is also transformed, the lightness change amounts are as shown in FIGS. 10A to 10D. For all the control points, lightness levels equal to or lower than lightness Lkp of the black point 600 remain unchanged. This is because a situation lightness L*<0 tends to occur if the lightness level is largely changed with respect to the sRGB color space.

In the example of FIGS. 10A to 10D, the lightness levels equal to or lower than lightness Lkp of the black point 600 are fixed. However, the present invention is not limited to this. For example, an arbitrary point having a lightness level equal to or higher than lightness Lkp of the black point 600 may be defined as a fixed point, and the lightness levels equal to or lower than that lightness may be fixed. That is, L*<0 need only be prevented upon transforming the printer gamut.

Since the lightness change amounts are defined, and those between the control points are compensated for by linear interpolation, the printer gamut and sRGB color space can be transformed to shapes suited to the calorimetric mapping method. When the same transform is applied to the printer gamut and sRGB color space, the colors inside the printer gamut can undergo colorimetrically approximate color reproduction. Also, the colors outside the printer gamut can be mapped onto those in a region which has high lightness levels and can easily set higher saturation levels.

Third Embodiment

Color processing according to the third embodiment of the present invention will be described below. Note that the same reference numerals in the third embodiment denote the same components as those in the first and second embodiments, and a detailed description thereof will be omitted.

the tone-preserved perceptual mapping method described in the first embodiment cannot realize uniform color reproduction, since the shape of the printer gamut changes if media and print quality are changed. In the calorimetric mapping method that attains colorimetrical matching described in the second embodiment, all colors outside the printer gamut are burnt out. In the third embodiment, a mapping method which reproduces approximate colors in a predetermined region and is free from any color burning-out irrespective of the shape of the printer gamut will be explained.

The mapping method assumed in the third embodiment sets a gamut (to be referred to as "colorimetrical matching region" hereinafter) in which colors are colorimetrical matching in the printer gamut. For example, a gamut having an 80% area near the center of the printer gamut is set as the colorimetrical matching region. Colors on the sRGB color space outside the colorimetrical matching region are mapped onto the printer gamut having the remaining 20% area.

For this purpose, whether or not each grid inside the printer gamut is that inside the colorimetrical matching region is checked, and the grids outside the colorimetrical matching region are transformed as in the first embodiment. When the grids on the sRGB color space are mapped onto the transformed printer gamut by the perceptual mapping method that keeps tone, colors outside the colorimetrical matching region can be satisfactorily reproduced.

Also, the following method can realize the same color reproduction as the aforementioned method. The transformation amount of the sRGB color space applies to the printer gamut to transform the printer gamut as well as the second embodiment. Or, a partial region corresponding to the colorimetrical matching region in the sRGB color space may be transformed. In this manner, since the correspondence between the printer gamut and sRGB color space is maintained, colorimetrical matching color reproduction can be realized in the colorimetrical matching region.

In this way, the present invention can be applied to the mapping method which combines colorimetrical matching and tone preservation. As described above, the present invention is not limited by mapping methods, and can be effectively applied to every mapping methods.

Fourth Embodiment

Color processing according to the fourth embodiment of the present invention will be described below. Note that the same reference numerals in the third embodiment denote the same components as those in the first to third embodiments, and a detailed description thereof will be omitted.

Even colors with an identical hue value on the CIELab color system often cannot appear as those with an identical hue value if their actual output colors are observed by a person. For example, blue is perceived as a color close to magenta if its hue is maintained on the CIELab color system. This is because the CIELab color system is not a perfect uniform color space and has a distortion in iso-hue characteristics of a blue part. Especially, the hue of blue of a high-saturation part is preferably shifted in the cyan direction as appearance of an actual color.

As an example, a method of mapping blue onto a favorable hue will be described below. Such mapping method by shifting the hue is an example to which the present invention can be effectively applied.

Figure 11:
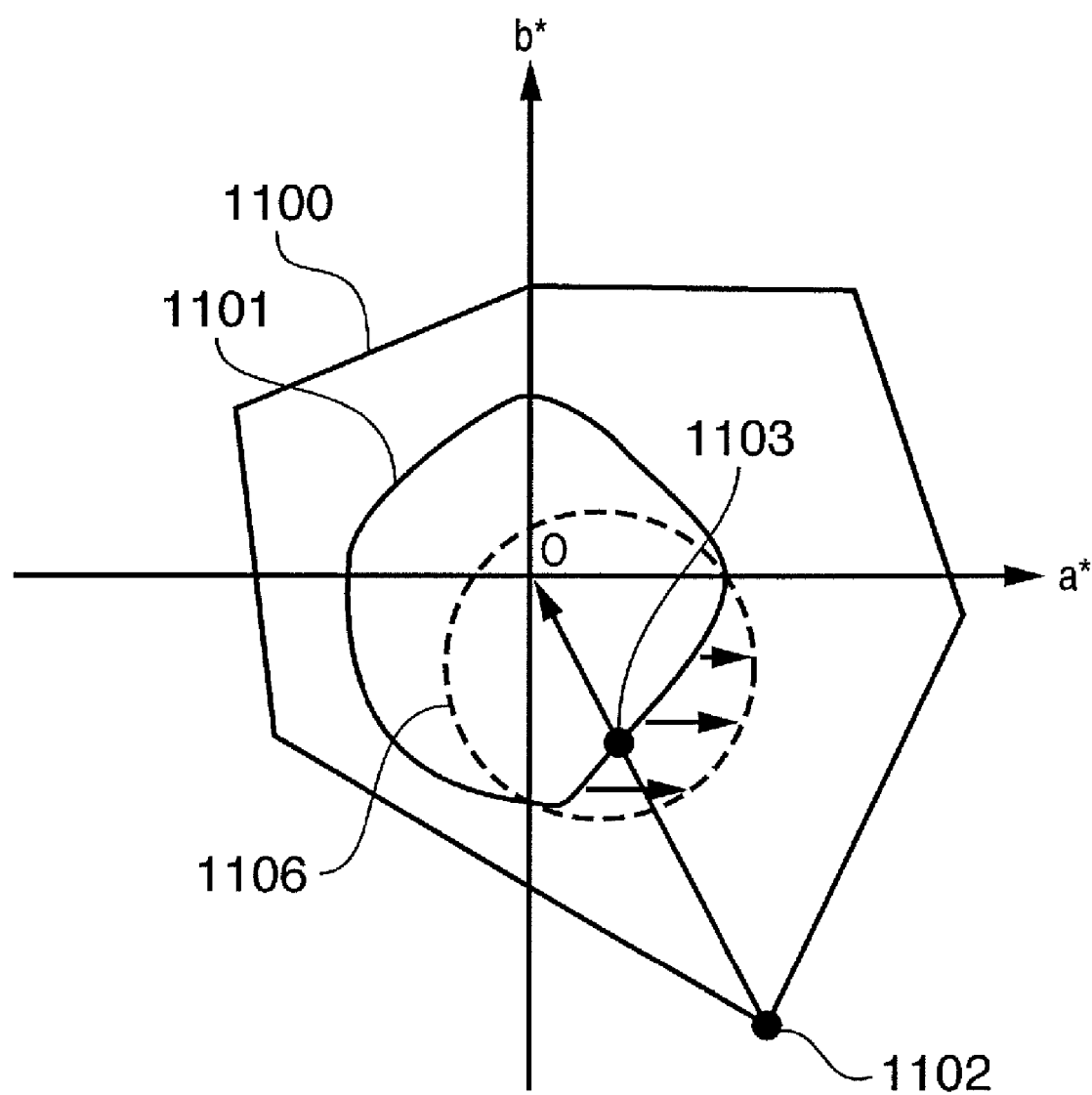
FIG. 11 shows given lightness sections of the sRGB color space and printer gamut 1.

FIG. 11 shows given lightness sections (a*b* plane) of an sRGB color space 1100 and printer gamut 1101.

A point 1102 is a basic color point of blue on the sRGB color space 1100, in other words, the point 1102 has blue hue and highest saturation. Assume that a convergence point O is a point on the gray axis. When the basic color point 1102 is mapped onto the printer gamut 1101 toward the point O, it is mapped onto a point 1103. In this state, since the hue of blue is maintained, color reproduction of favorable blue cannot be realized. Hence, the printer gamut 1101 is transformed to shift the blue region of the sRGB color space 1100 in the cyan direction upon mapping.

For example, as indicated by arrows in FIG. 11, an arc of a circle 1106 which passes through intersections where the printer gamut 1101 and the a* and b* axes intersect in the fourth quadrant is used. The printer gamut 1101 undergoes transform for extending the gamut in the positive direction of a* so that grids on the printer gamut 1101 are located on this arc. Note that the gamut of colorimetry space is only extended in the positive direction of a*, and the device RGB values corresponding to the colorimetry space are not changed.

Next, the sRGB color space 1100 is mapped onto a transformed printer gamut (to be referred to as "transformed gamut" hereinafter) 1107. When the basic color point 1102 is mapped onto the transformed gamut 1107 toward the point O, it is mapped onto a point 1104. Since the point 1104 on the colorimetry space corresponds to a point 1105 on the printer gamut 1101, when the point 1104 is transformed to the printer RGB, the point 1104 becomes the point 1105 on the printer gamut 1101.

That is, with the mapping method shown in FIG. 11, the basic color point 1102 of blue is mapped onto the point 1103 and blue close to magenta is reproduced. On the other hand, with the mapping method of the fourth embodiment shown in FIG. 12, the basic color point 1102 of blue is mapped onto the point 1105 and is reproduced as visually favorable blue in the cyan direction.

In this manner, when the printer gamut 1101 is transformed on the a*b* plane (in the direction of perceptual chromaticity), mapping can be done by shifting the hue. In the above description, the blue hue is shifted. Also, mapping can be done by similarly shifting other hues.

Figure 12:
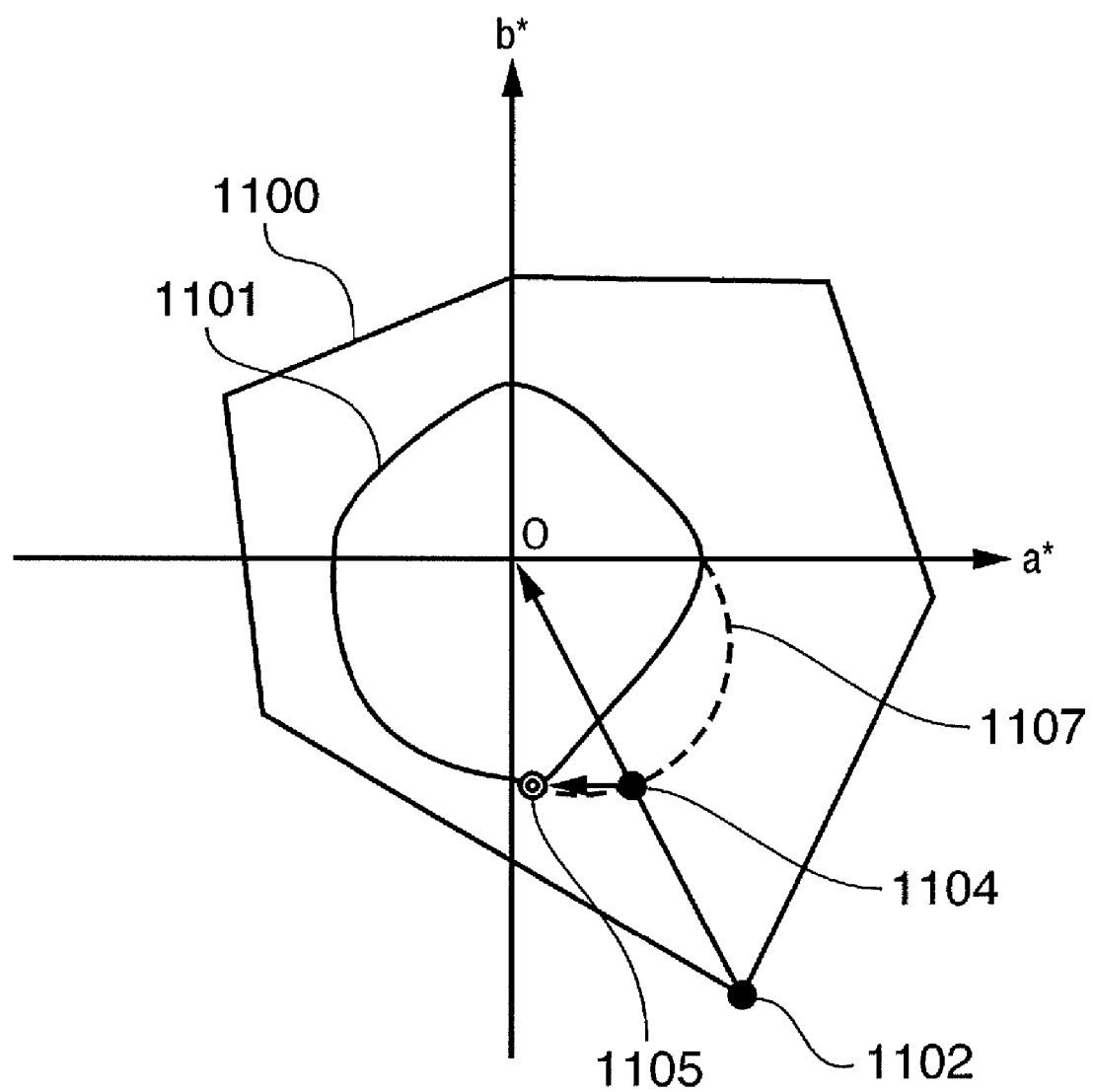
FIG. 12 is a schematic view of a state of gamut mapping according to the fourth embodiment.

In the examples shown in FIGS. 11 and 12, the printer gamut 1101 is transformed using the arc of the circle 1106. Alternatively, the printer gamut may be adaptively transformed using a combination of lines, a quadratic function, or the like.

In the above description, only the fourth quadrant of the printer gamut 1101 is transformed for the sake of simplicity. However, other regions can also be transformed.

Modification of Embodiment

In the above embodiments, when lines or curves indicating the boundary of the transformed gamut are set, those which pass through control points such as a black point, white point, basic color points, the intersections between the boundary and the a* and b* axes, and the like are set. However, in place of these control points, the user may designate one or a plurality of points through which the lines or curves pass, or may designate the lines or curves themselves.

In the above description, the sRGB color space is described as the color space of the input device, and the printer is described as the output device. However, the present invention is not limited to these. AdobeRGB may be used as the color space of the input device, and a monitor (monitor gamut) may be used as the output device.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program-code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2005-224593, filed Aug. 2, 2005, which is hereby incorporated by reference herein in its entirety.

What is claimed is:

1. A color processing method of converting color in a first gamut to color in a second gamut, comprising the steps of:
    setting control points on a boundary of the second gamut in a low-lightness region, wherein lightness of the low-lightness region is less than lightness of a maximum saturation point of the second gamut;
    setting a colorimetrical matching region in the second gamut, wherein color in the colorimetrical matching region is colorimetrically matched in a color conversion;
    generating a third gamut by transforming the second gamut to move the control points onto a line or curve which connects a black point of the second gamut with one of the control points so as to expand a recessed portion of the second gamut;
    transforming, in addition to the transformation in the generating step, the colorimetrical matching region in the second gamut and a region corresponding to the colorimetrical matching region in the first gamut, wherein a transformation amount of the region corresponding to the colorimetrical matching region in the first gamut applies to the colorimetrical matching region in the second gamut;
    performing colorimetrically approximate color reproduction on the color in the first gamut and inside the colorimetrical matching region;
    perceptually mapping the color in the first gamut and outside the colorimetrical matching region into the third gamut; and
    converting the color in the first gamut into the color in the second gamut based on the result of the reproduction and mapping.

2. The method according to claim 1, wherein in the mapping step, the mapping is realized by a compression method which moves the color in the first gamut toward a point in the third gamut.

3. A color processing method of converting color in a first gamut to color in a second gamut to generate a lookup table, comprising the steps of:
    setting control points on a boundary of the second gamut in a low-lightness region, wherein lightness of the low-lightness region is less than lightness of a maximum saturation point of the second gamut;
    setting a colorimetrical matching region in the second gamut, wherein color in the colorimetrical matching region is colorimetrically matched in a color conversion;
    generating a third gamut by transforming the second gamut to move the control points onto a line or curve which connects a black point of the second gamut with one of the control points so as to expand a recessed portion of the second gamut;
    transforming, in addition to the transformation in the generating step, the colorimetrical matching region in the second gamut and a region corresponding to the colorimetrical matching region in the first gamut, wherein a transformation amount of the region corresponding to the colorimetrical matching region in the first gamut applies to the colorimetrical matching region in the second gamut;
    performing colorimetrically approximate color reproduction on the color in the first gamut and inside the colorimetrical matching region;
    perceptually mapping the color in the first gamut and outside the colorimetric matching region into the third gamut;
    converting the color in the first gamut into the color in the second gamut based on the result of the reproduction and mapping; and
    storing a correspondence between the first gamut before the converting step and the first gamut after the converting step to the lookup table.

4. A color processing apparatus for converting color in a first gamut to color in a second gamut, comprising:
    a first setting section, arranged to set control points on a boundary of the second gamut in a low-lightness region, wherein lightness of the low-lightness region is less than lightness of a maximum saturation point of the second gamut;
    a second setting section, arranged to set a colorimetrical matching region in the second gamut, wherein color in the colorimetrical matching region is colorimetrically matched in a color conversion;
    a generator, arranged to generate a third gamut by transforming the second gamut to move the control points onto a line or curve which connects a black point of the second gamut with one of the control points so as to expand a recessed portion of the second gamut;
    a transformer, arranged to transform, in addition to the transformation by the generator, the colorimetrical matching region in the second gamut and a region corresponding to the colorimetrical matching region in the first gamut, wherein a transformation amount of the region corresponding to the colorimetrical matching region in the first gamut applies to the colorimetrical matching region in the second gamut;
    a mapping section, arranged to perform colorimetrically approximate color reproduction on the color in the first gamut and inside the colorimetrical matching region, and to perceptually map the color in the first gamut and outside the colorimetrical matching region into the third gamut; and
    a converter, arranged to convert the color in the first gamut into the color in the second gamut based on the result of the reproduction and mapping.

5. A color processing apparatus for converting color in a first gamut to color in a second gamut to generate a lookup table, comprising:
    a first setting section, arranged to set control points on a boundary of the second gamut in a low-lightness region, wherein lightness of the low-lightness region is less than lightness of a maximum saturation point of the second gamut;
    a second setting section, arranged to set a colorimetrical matching region in the second gamut, wherein color in the colorimetrical matching region is colorimetrically matched in a color conversion;
    a generator, arranged to generate a third gamut by transforming the second gamut to move the control points onto a line or curve which connects a black point of the second gamut with one of the control points so as to expand a recessed portion of the second gamut;
    a transformer, arranged to transform, in addition to the transformation by the generator, the colorimetrical matching region in the second gamut and a region corresponding to the colorimetrical matching region in the first gamut, wherein a transformation amount of the region corresponding to the colorimetrical matching region in the first gamut applies to the colorimetrical matching region in the second gamut;

a first mapping section, arranged to perform colorimetrically approximate color reproduction on the color in the first gamut and inside the colorimetrical matching region;

a second mapping section, arranged to perceptually map the color in the first gamut and outside the colorimetric matching region into the third gamut;

a converter, arranged to convert the color in the first gamut into the color in the second gamut based on the result of the reproduction and mapping a storing section, arranged to store a correspondence between the first gamut before the conversion and the first gamut after the conversion to the lookup table.

6. A non-transitory computer-readable storage medium storing a computer-executable program for causing a computer to perform a method of converting color in a first gamut to color in a second gamut, the method comprising the steps of:

setting control points on a boundary of the second gamut in a low-lightness region, wherein lightness of the low-lightness region is less than lightness of a maximum saturation point of the second gamut;

setting a colorimetrical matching region in the second gamut, wherein color in the colorimetrical matching region is colorimetrically matched in a color conversion;

generating a third gamut by transforming the second gamut to move the control points onto a line or curve which connects a black point of the second gamut with one of the control points so as to expand a recessed portion of the second gamut;

transforming, in addition to the transformation in the generating step, the colorimetrical matching region in the second gamut and a region corresponding to the colorimetrical matching region in the first gamut, wherein a transformation amount of the region corresponding to the colorimetrical matching region in the first gamut applies to the colorimetrical matching region in the second gamut;

performing colorimetrically approximate color reproduction on the color in the first gamut and inside the colorimetrical matching region, and perceptually mapping the color in the first gamut and outside the colorimetrical matching region into the third gamut; and converting the color in the first gamut into the color in the second gamut based on the result of the reproduction and mapping.

7. A non-transitory computer-readable storage medium storing a computer-executable program for causing a computer to perform a color processing method of converting color in a first gamut to color in a second gamut to generate a lookup table, and the lookup table being generated by the steps of:

setting control points on a boundary of the second gamut in a low-lightness region, wherein lightness of the low-lightness region is less than lightness of a maximum saturation point of the second gamut;

setting a colorimetrical matching region in the second gamut, wherein color in the colorimetrical matching region is colorimetrically matched in a color conversion;

generating a third gamut by transforming the second gamut to move the control points onto a line or curve which connects a black point of the second gamut with one of the control points so as to expand a recessed portion of the second gamut;

transforming, in addition to the transformation in the generating step, the colorimetrical matching region in the second gamut and a region corresponding to the colorimetrical matching region in the first gamut, wherein a transformation amount of the region corresponding to the colorimetrical matching region in the first gamut applies to the colorimetrical matching region in the second gamut;

performing colorimetrically approximate color reproduction on the color in the first gamut and inside the colorimetrical matching region;

perceptually mapping the color in the first gamut and outside the colorimetrical matching region into the third gamut;

converting the color in the first gamut into the color in the second gamut based on the result and outside the colorimetrical matching region; and storing a correspondence between the first gamut before the converting step and the first gamut after the converting step to the lookup table.

8. The medium according to claim 7, wherein the second gamut is a printer gamut, and the low-lightness region has the recessed portion toward a lightness axis of the second gamut, and the recessed portion is caused by a usage of a plain paper and a black color-pigment ink in a print.

* * * * *